United States Patent [19]
Kummer

[11] 3,713,154
[45] Jan. 23, 1973

[54] RADAR

[75] Inventor: Helmut Kummer, Ulm/Donau, Germany

[73] Assignee: Telefunken Patentverwertungs-G.m.b.H., Ulm-Donau, Germany

[22] Filed: Aug. 10, 1961

[21] Appl. No.: 131,963

[30] Foreign Application Priority Data

Aug. 20, 1960 Germany..................T 18878

[52] U.S. Cl.......................................343/9
[51] Int. Cl...............................G01s 9/44
[58] Field of Search............343/7.7, 8, 9, 17.1, 17.2

[56] References Cited

UNITED STATES PATENTS 2,522,367  9/1950  Guanella.........................343/9

*Primary Examiner*—Benjamin A. Borchelt
*Assistant Examiner*—G. E. Montone
*Attorney*—Spencer and Kaye

EXEMPLARY CLAIM

1. In an apparatus for locating targets by a radar system operating with very short electromagnetic waves, particularly for locating low-flying targets so that the antenna radiation pattern of said system touches ground, wherein a speed selection is combined with a distance selection, the line interval of the operating spectrum being greater than $2v_{max}/\lambda$, where $v_{max}$ = the maximum radial speed of the target relative to the system and $\lambda$ = the operating wave length of the system, the combination which comprises:

means for phase modulating a carrier frequency $f_o$ with a modulation frequency $f_1$ for producing a frequency spectrum containing substantially only the frequencies $f_o - f_1$, and $f_o$, and $f_o + f_1$; means for pulse modulating said frequency spectrum with a frequency $f_2$; means for transmitting the thus-modulated frequency spectrum; means for converting the echo signal, which if it has been reflected by a target which is travelling radially with respect to the transmitter antenna has been frequency shifted relative to the transmitted signal by an amount corresponding to the Doppler frequency, to an intermediate frequency; means for applying the thus-obtained intermediate frequency to a phase modulator for phase modulating the former with said frequency $f_1$, the latter being applied to said phase modulator via a first adjustable phase shifter; means for applying the output of said phase modulator to a keying unit which is keyed by said frequency $f_2$ via a second adjustable phase shifter; means for adjusting said second phase shifter for producing coincidence between the received signal and the keying pulse, the latter serving as a selection pulse; means for adjusting said first phase shifter for neutralizing the frequency modulation of the transmitter by counter-modulation in said phase modulation which counter-modulation has been shifted so that the distance of the target is obtained by adjustment of said phase shifter; and means for applying the distance selected output of said keying unit to a Doppler frequency filter for extracting from said signal intelligence concerning the speed of the target.

18 Claims, 7 Drawing Figures

3,713,154

RADAR

The present invention relates to radar.

More particularly, the present invention relates to a method and apparatus using very short electromagnetic waves for locating targets, especially low-flying targets, by means of antenna radiation patterns touching ground.

In order to engage a target by means of a body having a speed which is of the same order of magnitude as that of the target, it is necessary that the point of intercept be predetermined. This requires that the position of the body relative to the target, or a derivative thereof with respect to time, be known as a function of time in some coordinate system.

If the object radiates energy, it will give the observer information concerning the position of the object. If this energy is not radiated actively, the object to be located must be induced to radiate energy, i.e., the object must be irradiated with energy, which energy is then reflected and can be picked up by the observer. In other words, the system must be either an active system in which the target itself generates the radiations, or a passive system, in which all that the target does is to reflect energy emitted by the observer. In order to obtain exact information concerning the target, it is essential that only the direct exchange of energy with the target form any part of the computation, and it is therefore the primary mission of a locating and detecting system to select the particular energy which is involved in the direct exchange with the target.

The radiation pattern of an antenna, which with high-flying targets is an excellent selection means due to separation of the ground wave, is virtually useless insofar as the detection of low-flying objects is concerned.

Conventional radar sets, as, for example, pulse radar systems by means of which distance and bearing of the target can be determined, cannot be used to locate low-flying objects if the antenna radiation pattern touches ground. One known way in which targets can be located even then is to rely on the Doppler principle to determine the speed of the target, as used in CW radar sets. However, the accuracy of such systems is not very good; if, for instance, the ground reflection coefficient is 100 percent, there will be a measurement error of 10 percent of the altitude of the target if the radiation pattern touches ground, because there may then be, in addition to the direct energy exchange between the radar system and the target, an indirect energy exchange due to ground reflection.

It is an object of the present invention to overcome the above-described drawbacks of the prior art and to provide a method and apparatus by means of which the location of a target may be determined precisely, particularly in the case where the antenna radiation pattern touches ground.

According to the present invention, a target location method and apparatus are provided which combines a speed selection with a distance selection, i.e., a system in which a signal is produced that contains intelligence which is a function of both the speed and the distance of the target. However, a simultaneous selection of speed and distance is possible only if the line interval $\Delta f$ of the radar system spectrum is larger than $2(v_{max}/\lambda)$ ($v_{max}$ = maximum radial target speed, i.e., maximum speed of the target relative to the radar set taking the reading; $\lambda$ = operating wave length of the radar set), or, if targets travelling toward or away from the installation are to be tracked, $4(v_{max}/\lambda)$.

The distance measuring range of a locating system in which a unique or definite determination is made is equal to $R_{max} = (c/2 \Delta f)$ ($c$ = velocity of electromagnetic wave propagation); from this there is obtained the shortest wave length for the radar set $\lambda_{min} = (8 R_{max} \cdot v_{max}/c)$. Inasmuch as the values $R_{max}$ and $v_{max}$ are generally quite large, the operating wave length of the system will be greater than desirable.

A radar system which has a speed selection receives its noise energy only because of indirect ground reflections. Inasmuch as there is no indirect path between the target and the set which is shorter than the direct path from target to set, it is possible to make the distance selection ambiguous or indefinite without losing the selection ability of the system despite indirect ground reflections. Under these circumstances, it is therefore possible to use substantially shorter waves.

If a definite distance measurement is required, the indefiniteness arising in the above-described measurement must be eliminated. This is done by means of a second distance measurement which is likewise indefinite and which operates at a different fundamental frequency, it not being necessary, however, for this second distance measurement to be selective. There is then obtained a frequency spectrum having unequal line intervals, with no line interval, however, being less than $2(v_{max}/\lambda)$, or $4(v_{max}/\lambda)$ if, as stated above, coming and going targets are to be taken into consideration.

Additional objects and advantages of the present invention will become apparent upon consideration of the following description when taken in conjunction with the accompanying drawings in which.

Figure 1:
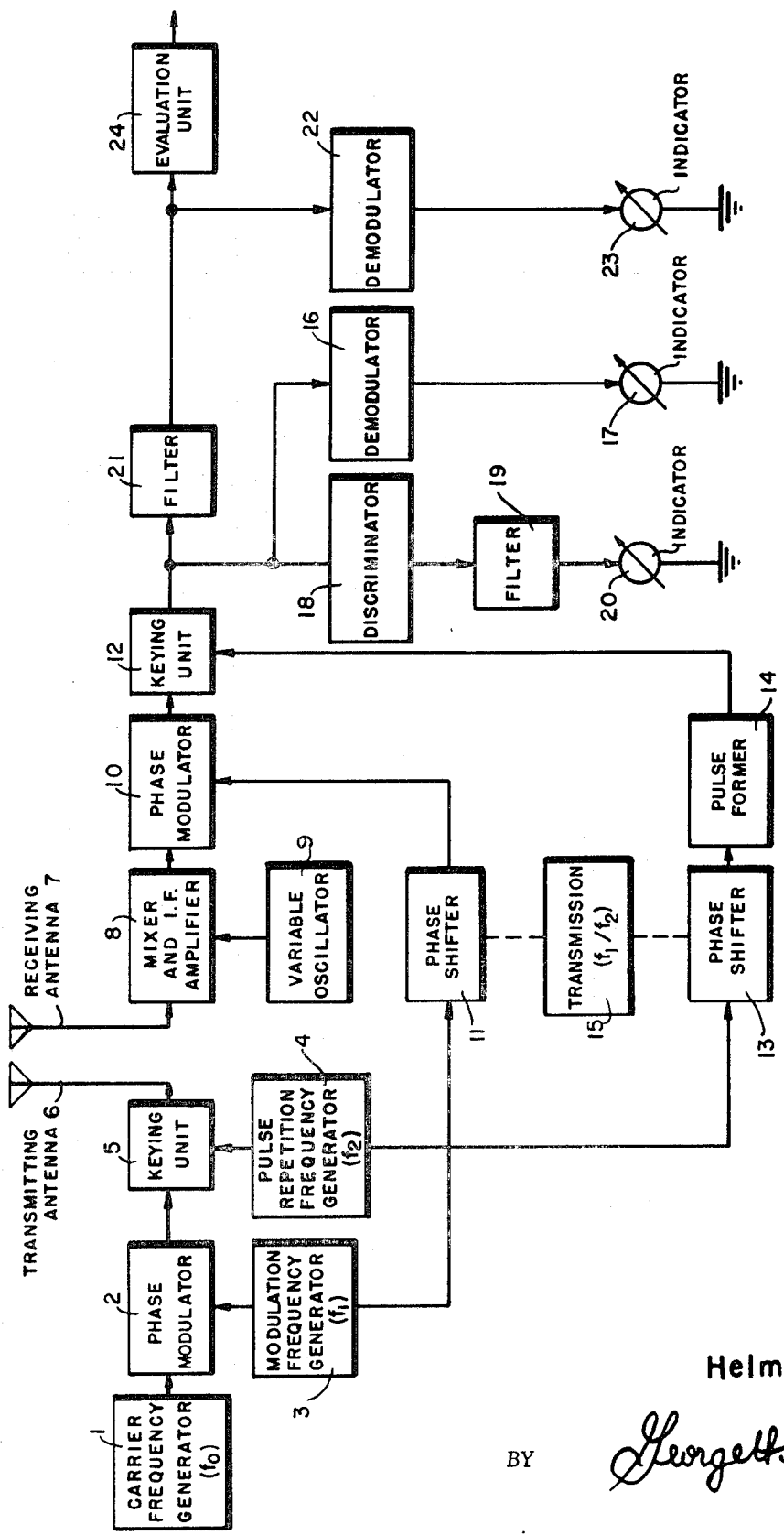
FIG. 1 is a block diagram of one embodiment of the present invention.
Figure 2:
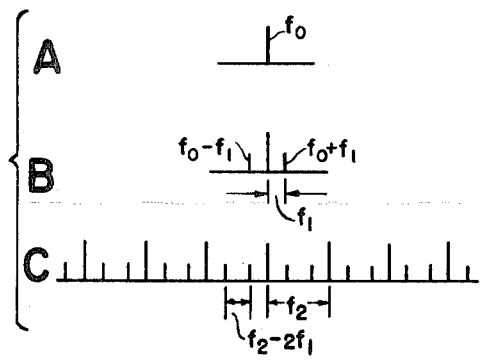
FIG. 2 shows, in Plots A, B, and C, the composition of the transmitted frequency spectrum produced by the arrangement shown in FIG. 1.

Referring now to the drawings, FIG. 1 shows a high frequency generator 1 which generates the carrier frequency $f_o$ (FIG. 2, Plot A) for example $10^{10}$ cycles per second, of the operating spectrum. A phase modulator 2 modulates onto the carrier frequency $f_o$ the modulation frequency $f_1$, for example, 48 kilocycles, which is generated by a modulation frequency generator 3. The phase deviation, i.e., the maximum difference between the instantaneous phase angle of the modulation frequency and the phase angle of the unmodulated carrier, is so selected that only the side frequencies $f_o + f_1$ and $f_o - f_1$ of the carrier frequency $f_o$ are produced (FIG. 2, Plot B). This corresponds to a frequency modulation of $f_o$ with $f_1$, the modulation index M, i.e., the ratio of frequency deviation to modulation frequency, being much larger than 1. The transmitter frequency spectrum which thus consists of three frequencies is then pulse modulated. The pulse repetition frequency $f_2$, which is produced by generator 4 and which may, for example, be equal to 150 kilocycles with a pulse width of 0.1 microsecond, controls the modulator or keying unit 5. The transmitter antenna 6 transmits the thus-obtained frequency spectrum (FIG. 2, Plot C).

The signal which is reflected by an object whose position is to be determined will be reflected and received after the elapse of a time interval $\tau$, this being the time interval during which the signal travels from the transmitting antenna 6 to the object and back to the receiving antenna 7. Furthermore, each line of the transmitted frequency spectrum will be shifted an amount corresponding to the Doppler frequency $f_D$, the latter being a function of the radial speed of the object, i.e., the speed of the target toward or away from the radar set.

Figure 3:
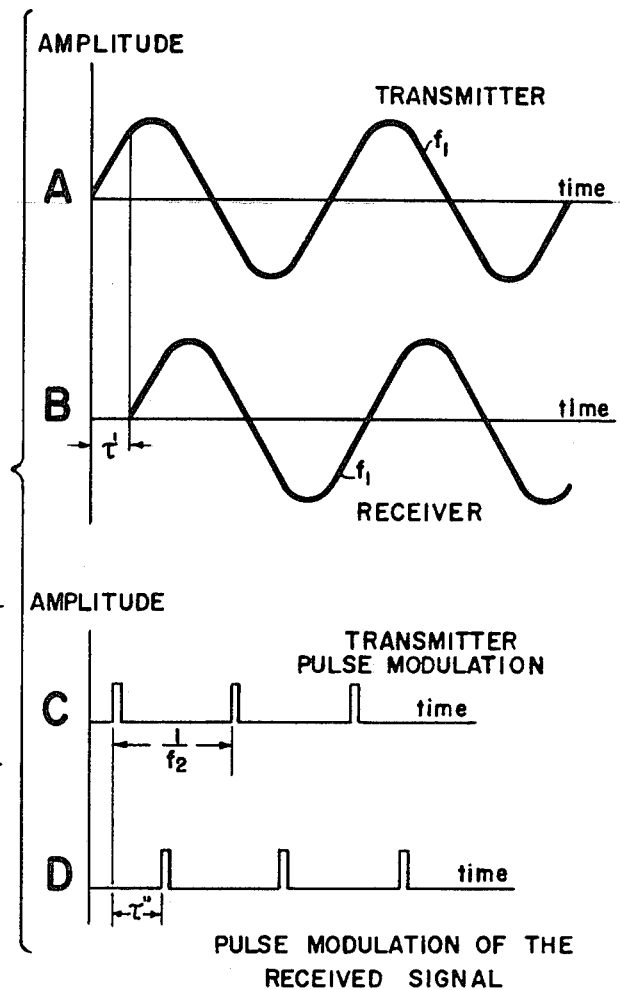
FIG. 3 shows, in Plots A, B, C, and D, the frequency and pulse modulation of the transmitted and received signals as functions of time.
Figure 4:
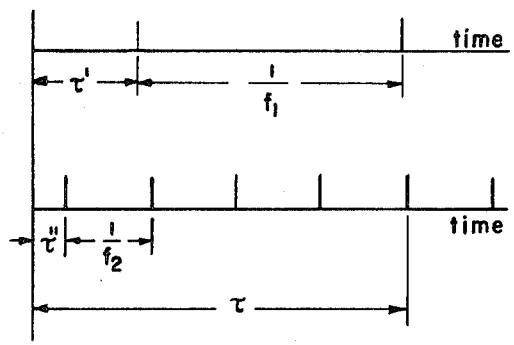
FIG. 4 shows how the distance can be ascertained by determining the duration or running time of the signal.

FIG. 3 shows the time interval elapsed between the transmitted and received signal, which time interval can be determined by $f_1$ and $f_2$. In Plot A, the modulation frequency $f_1$ represents the frequency modulation of the transmitter and is plotted as a function of time, and in Plot B the frequency modulation of the received signal is plotted as a function of time. By comparing the phase position of the transmitted and received $f_1$, there is obtained the value $\tau' = (2R/c) - n(1/f_1)$ (where $n = 1, 2, 3 \ldots$). $\tau'' = (2R/c) - m(1/f_2)$ (where $m = 1, 2, 3 \ldots$) is determined from the phase relationship between the transmitter pulse modulation, Plot C, and the pulse modulation of the received signal, Plot D. The total elapsed time $\tau = (2R/c)$, shown in FIG. 4, and thus the distance of the target, is obtained by coincidence determination.

Figure 5:
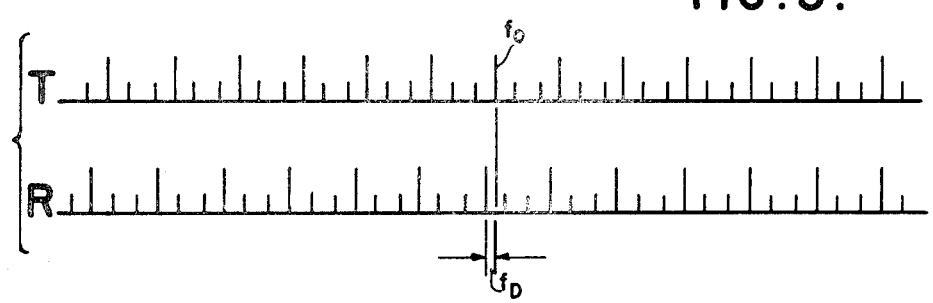
FIG. 5 shows the transmitted and received frequency spectra when the target is moving at a velocity having a component which is radial relative to the radar system.

FIG. 5 again shows the transmitted frequency spectrum T (FIG. 3, Plot C) and the received frequency spectrum R which is displaced by the Doppler frequency $f_D$. At the first approximation, all of the lines of the received spectrum are shifted by $f_D = (2v/\lambda)$.

Referring once again to FIG. 1, the received spectrum picked up by antenna 7 is fed to the mixer and I.F. amplifier 8 which is connected to a variable local oscillator 9. The incoming signal is thus heterodyned with the output of the oscillator and converted to an intermediate frequency which, after being amplified, is applied to a phase modulator 10, the latter having simultaneously applied to it, via a phase shifter 11, the frequency $f_1$ generated by generator 3. The signal is fed from the phase modulator 10 to a keying unit 12. This keying unit also has applied to it, via a phase shifter 13 and pulse former 14, the frequency $f_2$ produced by the generator 4. The phase shifters 11 and 13 are mechanically coupled to each other by a transmission 15 whose transmission ratio is $f_1/f_2$, so that the adjustable transmit times for $f_1$ and $f_2$ are the same.

Connected to the keying unit 12 is a circuit composed of a demodulator 16 and indicator 17, and a circuit composed of a discriminator 18, a filter for the frequency $f_1$, and an indicator 20. Maximum deflection of the indicator 17 is obtained by properly adjusting the phase shifter 13. In this case, the received signal and the superimposed pulse obtained from the pulse former 14 will coincide. If the indicator 20 now shows no deflection, this means that the phase shifter 11 is also properly adjusted, and frequency modulation of the transmitter will be neutralized by the corresponding counter-modulation in the phase modulator 10, whose running time has been shifted. In this case, the distance of the target from the radar set can be taken off mechanically from the axle of the phase shifter, the latter being associated with means which are suitably calibrated for this purpose. The signal returned by the target, which is now indicative of the distance of the target, is also applied from the keying unit 12 to a Doppler frequency filter 21 ($\Delta f$ being, for example, equal to 2 kilocycles). The output of the frequency filter 21 is connected to a demodulator 22, whose output, in turn, is connected to an indicator 23. Maximum deflection of the indicator 23 is obtained by fine adjustment of oscillator 9. It will be seen therefore, that the echo signal obtained from the Doppler frequency filter 21 contains intelligence indicative of the distance of the target as well as intelligence indicative of the target speed. The signal is then processed in a further unit 24 in which intelligence indicative of the angle or bearing of the target may be evaluated.

Figure 6:
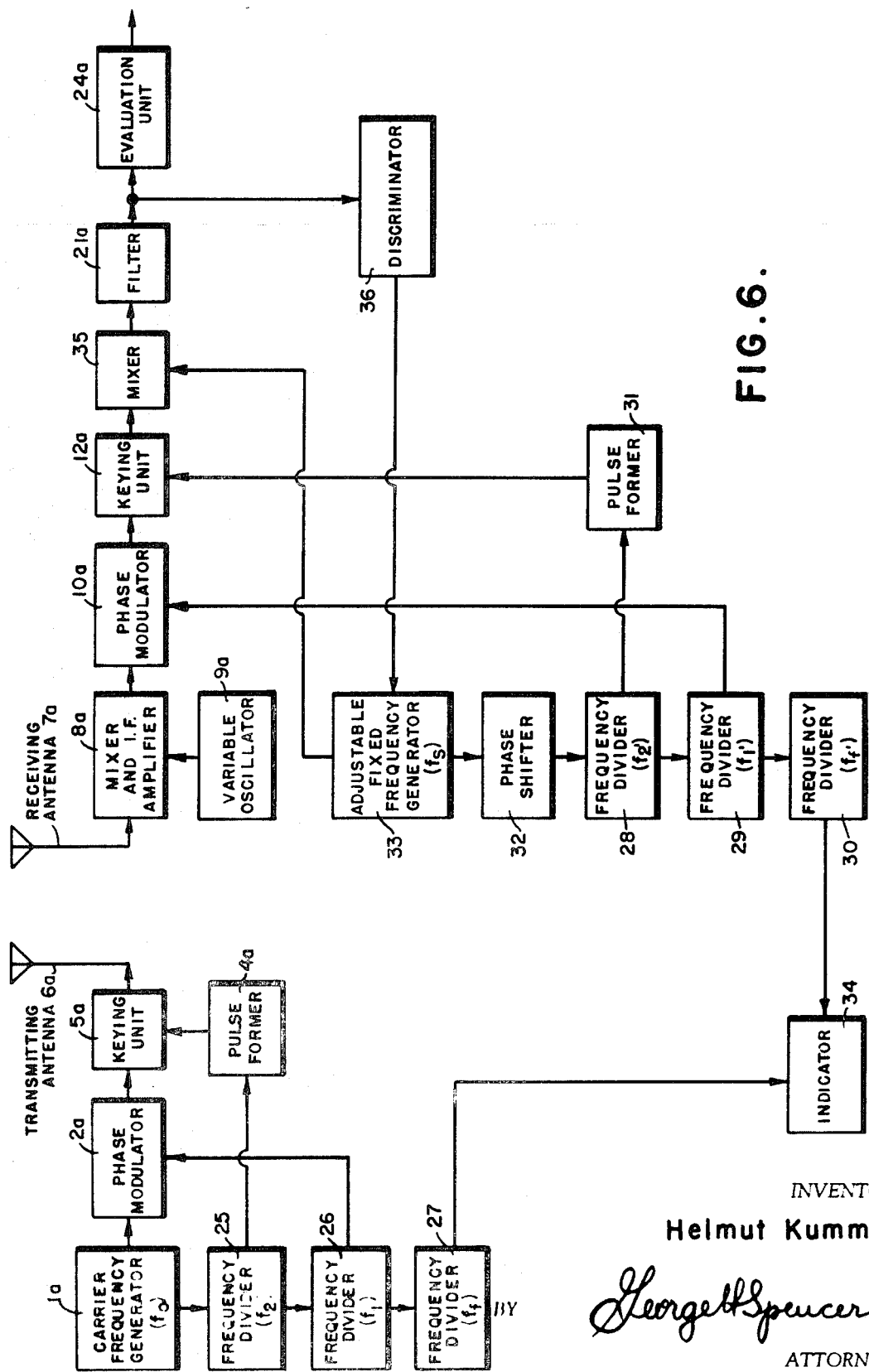
FIG. 6 is a block diagram of a modified embodiment of the present invention.

FIG. 6 shows a fully automatic radar system according to the present invention. The pulse repetition frequency $f_2$ and the modulation frequency $f_1$ are obtained from the carrier frequency generator 1a generating the carrier frequency $f_o$ by means of frequency dividers 25 and 26, respectively. From the maximum range of the radar system, for example 25 kilometers, which is fixed by the frequencies $f_1$ and $f_2$, there is obtained a fundamental frequency $f_f$ of 6 kilocycles, which is obtained from an additional frequency divider 27 and which serves as a reference for the distance measurement. The phase modulator 2a modulates the frequency $f_1$ obtained from the frequency divider 26 onto the carrier frequency $f_o$. The pulse modulation of the transmitted spectrum occurs in keying unit 5a, the pulse repetition frequency $f_2$ being produced by the pulse former 4a which is controlled by the frequency divider 25. The transmitting antenna 6a transmits the thus-resulting frequency spectrum. The receiver portion then receives, via receiving antenna 7a, the spectrum whose frequency has been shifted by the Doppler frequency $f_D$, the latter depending on the speed of the target with respect to the radar set. The incoming signal is fed to a mixer and I.F. amplifier 8a where, as in the above-described embodiment, it is transformed into an intermediate frequency by means of the oscillator 9a and then fed to phase modulator 10a.

The system further includes an adjustable fixed frequency generator 33 and three frequency dividers 28, 29, and 30. The generator 33 generates a fixed frequency $f_s$ which, assuming the wave length to be 3 centimeters and the maximum target speed to be $\pm 600$ meters/second relative to the radar set, can be adjusted about the carrier frequency $f_o$ by an amount equal to $\pm 40$ kilocycles, and by appropriately designing the frequency dividers 28, 29, and 30, the frequencies $f_2'$, $f_1'$, and $f_f'$ necessary for obtaining a distance selection and distance measurement are produced. The frequency $f_1'$ from the divider 29 is applied to the phase modulator 10a, from whence the echo signal is applied to the keying unit 12a, which also has applied to it, via pulse former 31, the frequency $f_2'$ coming from the divider 28.

The distance selection is carried out in the following manner: with a one-time input of the target distance, the phase shifter 32 between the generator 33 and the frequency divider 28 is adjusted until the frequency modulation in modulator 10a is neutralized by appropriate counter-modulation with $f_1'$ from divider 29, and there is complete coincidence in the keying unit 12a between the echo signal and the frequency $f_2'$ from the pulse former 31. This adjustment is similar to that described above in connection with the system shown in FIG. 1. Consequently, there are fixed phase relationships between the generator 33 and the frequency dividers 28, 29, and 30. The distance of the target is obtained by comparing the phase of the 6 kilocycle phase-fixed reference voltage $f_f$ coming from the transmitter part of the system with the phase of the 6 kilocycle voltage $f_f'$ coming from the frequency divider 30, this latter voltage being phase-shifted by an amount corresponding to the distance of the target. This comparison is made by appropriate means such as an indicator 34.

The distance selected received signal is fed from keying unit 12a, via a mixer 35, to the Doppler frequency filter 21a. The generator 33, whose output, as stated above, is adjustable ± 40 kilocycles about the carrier frequency $f_o$, is now so adjusted that the echo signal can pass through the Doppler frequency filter 21a. A discriminator 36 at the output of the filter 21a produces a fault signal proportional to the frequency (the middle of the pass-through range of the Doppler frequency filter). This fault signal controls the generator 33 in such a manner as to produce zero adjustment. This control circuit responds to speed changes of the target. If the control circuit responds without error, the frequency dividers 28, 29, and 30, by integrating the speed with respect to time, produce errorless phase relations which correspond to the particular distance of the target. The speed and distance selected signal which is put out by the filter 21a is applied to an evaluating unit 24a for determining the bearing, as, for instance, in the case of a direction-finding system of the conical-scan type.

Figure 7:
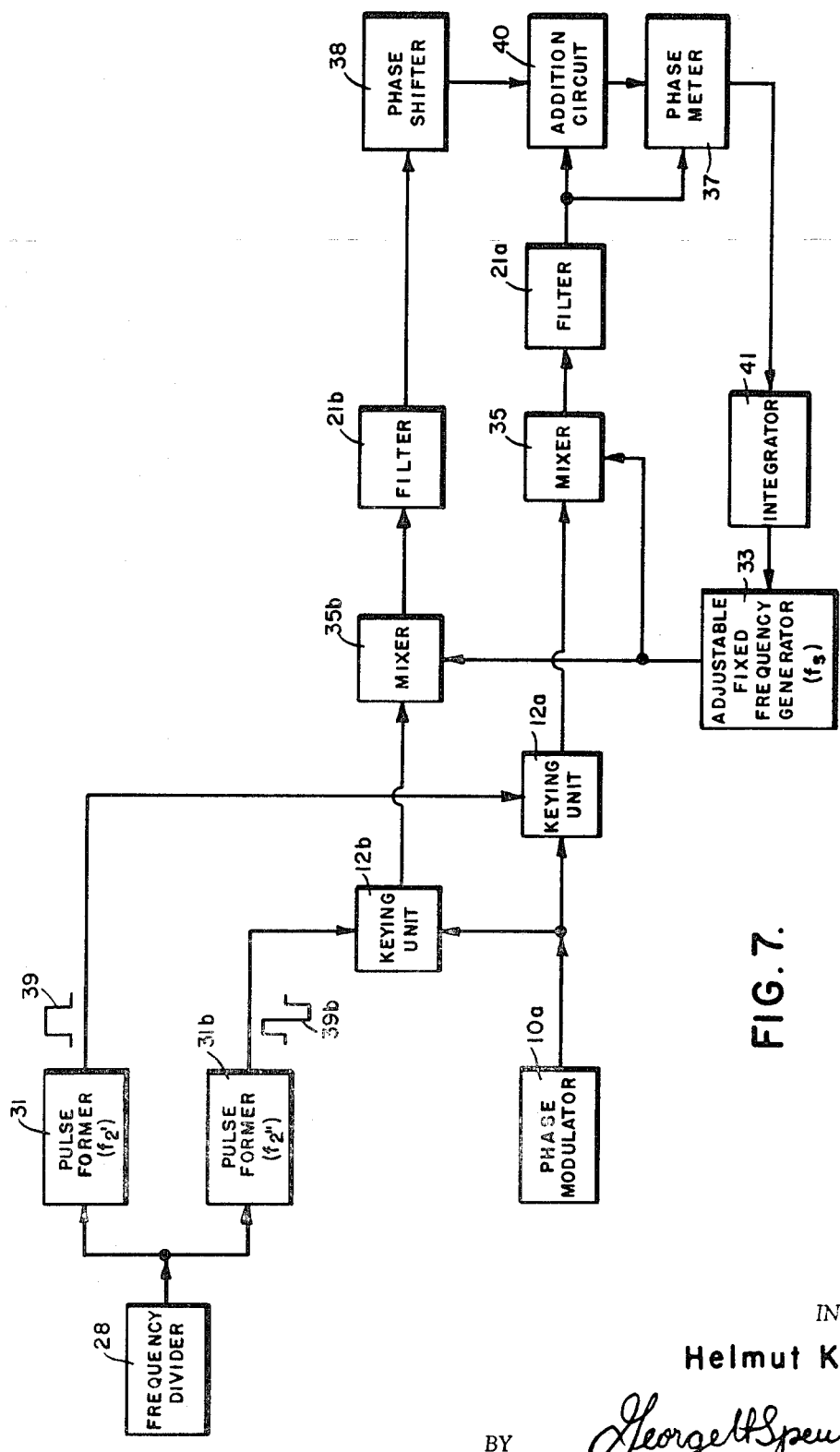
FIG. 7 is a partial block diagram of yet another modified embodiment of the present invention.

The above-described follow-up arrangement for the generator 33 is not suitable for the track-while-scan system. Instead, the fault signal for controlling the generator 33 can be taken from a phase meter 37, shown in FIG. 7. The circuit of FIG. 7 comprises a channel which includes components 31, 12a, 35 and 21a, described above in connection with FIG. 6, and a second parallel channel which includes analogous components, namely, a pulse former 31b, a keying unit 12b, a mixer 35b, a filter 21b, as well as a phase shifter 38. The pulse former 31b produces a pulse 39b ($f_2''$) in synchronism with the pulse 39 ($f_2'$) produced by the pulse former 31. This pulse 39b controls the keying unit 12b. The signal in this second channel is fed, via mixer 35b, to filter 21b and phase shifter 38 which shifts the phase of the signal by 90°. The output signals emanating from the filter 21a and the phase shifter 38 are added in an addition circuit 40. The outputs of filter 21a and addition circuit 40 are applied to a phase meter 37, whose output signal is proportional to the difference between the distance of the target and the distance stored in divider 28. This output signal is applied to the generator 33 via an integrator 41 in such a manner that the former is zero regulated at the output of phase meter 37. This arrangement has the advantage that the information obtainable from the target can be taken intermittently, whereas the follow-up system according to FIG. 6 requires continuous input of information.

The present invention is not limited to intercepting and engaging low-flying targets, but also finds use in automatic and/or instrument landing systems.

Inasmuch as the system according to the instant invention contains additional selection means, it is basically less susceptible to jamming than existing systems. This advantage comes into play when high-flying targets are being located, i.e., when the antenna radiation pattern is not along ground, if the target employs electronic counter-measures as, for instance, metallic strips intended to interfere with the radar signals.

It will be understood that the above description of the present invention is susceptible to various modifications, changes, and adaptations, and the same are intended to be comprehended within the meaning and range of equivalents of the appended claims.

What is claimed is:

1. In an apparatus for locating targets by a radar system operating with very short electromagnetic waves, particularly for locating low-flying targets so that the antenna radiation pattern of said system touches ground, wherein a speed selection is combined with a distance selection, the line interval of the operating spectrum being greater than $2(v_{max}/\lambda)$, where $v_{max}$ = the maximum radial speed of the target relative to the system and $\lambda$ = the operating wave length of the system, the combination which comprises: means for phase modulating a carrier frequency $f_o$ with a modulation frequency $f_1$ for producing a frequency spectrum containing substantially only the frequencies $f_o - f_1, f_o$, and $f_o + f_1$; means for pulse modulating said frequency spectrum with a frequency $f_2$; means for transmitting the thus-modulated frequency spectrum; means for converting the echo signal, which if it has been reflected by a target which is travelling radially with respect to the transmitter antenna has been frequency shifted relative to the transmitted signal by an amount corresponding to the Doppler frequency, to an intermediate frequency; means for applying the thus-obtained intermediate frequency to a phase modulator for phase modulating the former with said frequency $f_1$, the latter being applied to said phase modulator via a first adjustable phase shifter; means for applying the output of said phase modulator to a keying unit which is keyed by said frequency $f_2$ via a second adjustable phase shifter; means for adjusting said second phase shifter for producing coincidence between the received signal and the keying pulse, the latter serving as a selection pulse; means for adjusting said first phase shifter for neutralizing the frequency modulation of the transmitter by counter-modulation in said phase modulation which counter-modulation has been shifted so that the distance of the target is obtained by adjustment of said phase shifter; and means for applying the distance selected output of said keying unit to a Doppler frequency filter for extracting from said signal intelligence concerning the speed of the target.

2. Apparatus as defined in claim 1, further comprising means for mechanically coupling said phase shifters such that the adjustable running times for $f_1$ and $f_2$ are equal.

3. Apparatus as defined in claim 1, wherein said intermediate frequency is fine-adjusted for purposes of speed selection such that the demodulated output voltage of said Doppler frequency filter is a maximum.

4. Apparatus as defined in claim 1, further comprising means for extracting from the received signal intelligence concerning the bearing of the target.

5. Apparatus as defined in claim 4, wherein said intelligence concerning the bearing of the target is obtained from the Doppler frequency filter.

6. In an apparatus for locating targets by a radar system operating with very short electromagnetic waves, particularly for locating low-flying targets so that the antenna radiation pattern of said system touches ground, wherein a speed selection is combined with a distance selection, the line interval of the operating spectrum being greater than $2(v_{max}/\lambda)$, where $v_{max}$ = the maximum radial speed of the target relative to the system and $\lambda$ = the operating wave length of the system, the combination which comprises: means for phase modulating the carrier frequency $f_o$ of the operating spectrum with a modulation frequency $f_1$ which is in fixed relationship relative to said carrier frequency for producing a frequency spectrum containing substantially only the frequencies $f_o - f_1$, $f_o$, and $f_o + f_1$; means for pulse modulating said frequency spectrum with a pulse repetition frequency $f_2$ which is in fixed relationship relative to said carrier frequency; means for transmitting the thus-modulated frequency spectrum; means for converting the echo signal, which if it has been reflected by a target which is travelling radially with respect to the transmitter antenna has been frequency shifted relative to the transmitted signal by an amount corresponding to the Doppler frequency, to an intermediate frequency; means for applying the thus-obtained intermediate frequency to a phase modulator for phase modulating the former with a frequency $f_1'$ derived from a frequency $f_s$ generated by an adjustable fixed frequency generator, the range of adjustability of said frequency $f_s$ depending on $f_o$ and the maximum radial target speed to be encountered; means for applying the output voltage of said phase modulator to a keying unit which is keyed by a frequency $f_2'$ derived from said fixed frequency generator; means for phase shifting the frequencies $f_1'$ and $f_2'$ for neutralizing the frequency modulation of the received signal by corresponding counter modulation in said phase modulator and for producing coincidence in said keying unit between the received signal and the frequency $f_2'$; means for comparing the phase position of a reference voltage $f_f$ derived from said carrier frequency with the phase position of an indicator voltage $f_f'$ which is phase-fixed relative to a voltage of said frequency $f_s$ of said fixed frequency generator for determining the target distance; and means for mixing the distance selected signal with said fixed frequency $f_s$ derived from said fixed frequency generator, the latter being finely regulated such that the output voltage of a Doppler frequency filter which is connected to the last mixer stage is a maximum.

7. Apparatus as defined in claim 6, wherein the fixed frequency generator is finely regulated by the output voltage of said Doppler frequency filter.

8. Apparatus as defined in claim 6, wherein the fixed frequency generator is finely regulated by the output voltage of a phase modulator which has applied to it, via two parallel channels, signals derived from frequencies $f_2'$ and $f_2''$, said frequency $f_2''$ being in synchronism with said frequency $f_2'$ and phase-shifted relative thereto by 90°, said frequencies being added such that the output signal of said phase modulator is proportional to the difference between the distance of the target and the distance stored in said fixed frequency generator.

9. Apparatus as defined in claim 6 further comprising means for applying the distance and speed selected signal to an evaluating unit for extracting from said signal intelligence concerning the bearing of the target.

10. A radar system comprising, in combination: a carrier frequency generator; a first phase modulator connected to the output of said carrier frequency generator; a modulation frequency generator having its output connected to said first phase modulator; a first keying unit connected to the output of said first phase modulator; a pulse repetition frequency generator having its output connected to said first keying unit; a transmitting antenna connected to the output of said first keying unit; a receiving antenna; a mixer and I.F. amplifier connected to the output of said receiving antenna; an oscillator having its output connected to said mixer and I.F. amplifier; a second phase modulator connected to the output of said mixer and I.F. amplifier; a second keying unit connected to the output of said second phase modulator; a first phase shifter having its input connected to said modulation frequency generator and its output to said second phase modulator; a second phase shifter having its input connected to said pulse repetition frequency generator and its output to said second keying unit; a transmission interconnecting said phase shifters and having a transmission ratio equal to the ratio of the frequency of said modulation frequency generator to the frequency of said pulse repetition frequency generator; and measuring means connected to the output of said second keying unit; said system thereby producing an operating spectrum generating a signal containing intelligence which is a function of both the speed and distance of a target, the line interval of the operating spectrum being greater than $2(v_{max}/\lambda)$, or, if targets travelling toward or away from the system are to be located, $4(v_{max}/\lambda)$, where $v_{max}$ = the maximum radial speed of the target relative to the system and $\lambda$ = the operating wave length of the system.

11. A radar system as defined in claim 10, further comprising a Doppler frequency filter connected to the output of said second keying unit.

12. A radar system as defined in claim 11, further comprising an evaluating unit connected to the output of said Doppler frequency filter.

13. A radar system comprising, in combination: a carrier frequency generator; first and second frequency dividers connected to said carrier frequency generator for deriving from the carrier frequency a pulse repetition frequency $f_2$ and a modulation frequency $f_1$, respectively; a first phase modulator connected to the output of said carrier frequency generator and to the output of said second frequency divider; a first keying unit connected to the output of said first phase modulator and to the output of said first frequency divider; a transmitting antenna connected to the output of said first keying unit; a receiving antenna; a mixer and I.F. amplifier connected to the output of said receiving antenna; an oscillator having its output connected to said mixer and I.F. amplifier; a second phase modulator connected to the output of said mixer and I.F. amplifier; a second keying unit connected to the output of said second phase modulator; a mixer connected to the output of said second keying unit; an adjustable fixed frequency generator for generating a frequency $f_s$ and having its output connected to said last-mentioned mixer; a phase shifter connected to the output of said fixed frequency generator; third and fourth frequency dividers connected to the output of said phase shifter for deriving from said frequency $f_s$ generated by said fixed frequency generator a reference frequency $f_2'$ and a reference frequency $f_1'$, respectively, the output of said third frequency divider connected to said second keying unit and the output of said fourth frequency divider being connected to said second phase modulator; a Doppler frequency filter connected to the output of said last-mentioned mixer; and a control circuit connected to the output of said Doppler frequency filter for producing a fault signal proportional to the Doppler frequency, the output of said control circuit being connected to the input of said fixed frequency generator for adjusting the same in response to the speed of the target; said system thereby producing an operating spectrum generating a signal containing intelligence which is a function of both the speed and distance of a target, the line interval of the operating spectrum being greater than $2(v_{max}/\lambda)$, or, if targets travelling toward or away from the system are to be located, $4(v_{max}/\lambda)$, where $v_{max}$ = the maximum radial speed of the target relative to the system and $\lambda$ = the operating wave length of the system.

14. A radar system as defined in claim 13, further comprising a fifth frequency divider connected to said carrier frequency generator for deriving from the carrier frequency a phase-fixed reference voltage $f_f$; a sixth frequency divider connected to the output of said phase shifter for deriving from the fixed frequency an output voltage $f_f'$ which is phase-shifted by an amount corresponding to the distance of the target; and means for comparing the phases of $f_f$ and $f_f'$.

15. A radar system as defined in claim 14, wherein said control circuit comprises a discriminator having its input connected to said Doppler frequency filter.

16. A radar system as defined in claim 15, wherein said control circuit comprises means deriving from said third frequency divider a signal $f_2''$ which is in synchronism with said reference frequency $f_2'$ and which is phase-shifted by 90° relative thereto; and means for adding said frequencies $f_2'$ and $f_2''$ such that the output signal of said second phase modulator is proportional to the difference between the distance of the target and the distance represented by the fixed frequency generated by said fixed frequency generator, the output of said last-mentioned means being applied to said fixed frequency generator for controlling the same.

17. A radar system as defined in claim 15, wherein a first pulse former is interposed between said third frequency divider and said second keying unit for delivering to the latter said reference frequency $f_2'$ and wherein said control circuit comprises: a second pulse former connected to the output of said third frequency divider and deriving therefrom a reference frequency $f_2''$; a third keying unit connected to the output of said second phase modulator and to the output of said second pulse former; an additional mixer connected to the output of said fixed frequency generator and to the output of said third keying unit; an additional Doppler frequency filter connected to the output of said additional mixer; an additional phase shifter connected to the output of said additional Doppler frequency filter; an addition circuit connected to the output of the first-mentioned Doppler frequency filter and to the output of said additional phase shifter; and a phase meter connector to the output of said first-mentioned Doppler frequency filter and to the output of said addition circuit, the output of said phase meter being connected to the input of said fixed frequency generator for controlling the same.

18. A radar system as defined in claim 17, further comprising an integrator interposed between the output of said phase meter and the input of said fixed frequency generator.

* * * * *